(12) United States Patent
Conaway et al.

(10) Patent No.: US 8,475,240 B2
(45) Date of Patent: Jul. 2, 2013

(54) POULTRY DE-FEATHERING APPARATUS AND METHODS

(75) Inventors: Jesse Frederick Conaway, Seaford, DE (US); Duaine Thome, Mentor, OH (US); Paul Miller, Mentor, OH (US)

(73) Assignee: Sofrsystem, LLC, Georgetown, DE (US)

( * ) Notice: Subject to any disclaimer, the term of this patent is extended or adjusted under 35 U.S.C. 154(b) by 113 days.

(21) Appl. No.: 12/745,467

(22) PCT Filed: Jan. 16, 2008

(86) PCT No.: PCT/US2008/051242
§ 371 (c)(1),
(2), (4) Date: Oct. 13, 2011

(87) PCT Pub. No.: WO2009/073239
PCT Pub. Date: Jun. 11, 2009

(65) Prior Publication Data
US 2012/0052781 A1   Mar. 1, 2012

Related U.S. Application Data

(60) Provisional application No. 60/991,688, filed on Nov. 30, 2007.

(51) Int. Cl.
*A22B 5/08* (2006.01)
(52) U.S. Cl.
USPC ............................................... 452/82
(58) Field of Classification Search
USPC ................................. 452/82–93, 97
See application file for complete search history.

(56) References Cited

U.S. PATENT DOCUMENTS

| | | | | |
|---|---|---|---|---|
| 3,124,832 A * | 3/1964 | Kravetz et al. | ................. | 452/93 |
| 4,292,709 A * | 10/1981 | van Mil | ........................... | 452/91 |
| 4,799,293 A * | 1/1989 | Dewberry et al. | .............. | 452/93 |
| 4,873,747 A * | 10/1989 | Dewberry et al. | .............. | 452/93 |
| 6,918,825 B2 | 7/2005 | Conaway | ........................ | 452/88 |
| 7,195,553 B2 * | 3/2007 | Knight | ............................ | 452/93 |
| 7,387,565 B1 * | 6/2008 | Griffiths et al. | ................ | 452/87 |

FOREIGN PATENT DOCUMENTS

FR   1 469 721 A   2/1967

OTHER PUBLICATIONS

Israel Office Action dated Jun. 12, 2012 issued in Application No. 206066.
European Search Report dated Aug. 14, 2012 issued in Application No. 08 70 5962.

* cited by examiner

*Primary Examiner* — Richard Price, Jr.
(74) *Attorney, Agent, or Firm* — KED & Associates, LLP (57) ABSTRACT

Apparatus for de-feathering (i.e. picking or plucking) poultry. More particularly, picking apparatus employing a plurality of elongated picking elements which are resistant to cracking and/or micro-poring, and which are preferably flexible and/or bendable and which are of sufficiently low mass such as to decrease poundage yield loss (e.g., decrease fat loss and poultry wing damage). In some embodiments, apparatus comprised of a plug and elongated picking element combination which is removably installable to a conventional picking disk structure. In other embodiments, picking element kits for converting existing picking line machinery. In still other embodiments, methods and/or apparatus for improving feather picking ability and/or efficiency and/or cleanliness.

18 Claims, 8 Drawing Sheets

POULTRY DE-FEATHERING APPARATUS AND METHODS

CROSS-REFERENCE TO RELATED APPLICATIONS

This application claims priority to U.S. Provisional Patent Application No. 60/991,688, filed on Nov. 30, 2007, the entirety of which is hereby incorporated by reference. U.S. Pat. No. 6,918,825 is also hereby incorporated by reference in its entirety. All references cited herein are incorporated in their entirety.

FIELD OF THE INVENTION

This invention relates to apparatus for de-feathering (i.e., picking or plucking) poultry. More particularly, this invention relates to picking apparatus and methods employing a plurality of elongated picking elements which are resistant to cracking and/or micro-poring, and which are preferably flexible and/or bendable and/or which are of sufficiently low mass such as to decrease poundage yield loss (e.g., decrease fat loss and poultry wing damage). In some embodiments, this invention relates to apparatus comprising of a plug and elongated picking element combination which is removably installable to a conventional picking disk structure. In other embodiments, this invention relates to picking element kits for converting existing picking line machinery. In still other embodiments, this invention relates to methods and/or apparatus for improving feather picking ability and/or efficiency and/or cleanliness.

BACKGROUND OF RELATED TECHNOLOGY

Throughout the world markets, including in the United States, many millions of toils of poultry are raised and slaughtered for commercial sale annually. For the vast majority of commercially raised poultry, the animals (e.g., chickens, turkeys, specialty hens, and the like) are raised by contract growers and then transported to processing facilities where the poultry is slaughtered and then processed for sale (e.g. de-feathered, eviscerated, and butchered). Typically, prior art de-feathering operations, the bird carcasses are first scalded with high temperature water (to aid in the removal of feathers) and then transported through a "picking" line. A conventional picking line, as is employed prolifically throughout the United States and the world, utilizes a conveying system by which poultry carcasses are carried between batteries of rotating picking disks or drums having rubber picking fingers extending therefrom. As the carcasses traverse the picking line, the rubber fingers strike the bird carcasses (as they rotate mounted on the rotating picking disks or drums) and bind the feathers, thereby removing them as the carcass continues its passage.

Although the prior art apparatus and process have been employed throughout the industry for many years, various drawbacks of the prior art have been discovered to exist. In this regard, the rubber picking fingers used for binding the feathers of the poultry during de-feathering operations (employed on the rotating picking disks and/or drums) are prone to cracking and/or forming microscopic holes (i.e. microporing) which can harbor bacteria. Because poultry carcasses passes through a picking line sequentially, if a given "finger" or set of "fingers" is contaminated, then it is possible that bacteria will be passed to each carcass which contacts that finger or set of fingers thereafter. For these reasons, strict operation guidelines have been established, in accordance with United States Department of Agriculture laws and regulations, to ensure that contamination of picking lines is minimized (so that contaminated meat is not sold to consumers). For example, in order to prevent and/or decrease contamination risk, typical industry guidelines mandate that the picking line be shut down periodically for cleaning (e.g., twice a day). During these cleanings, there is significant downtime in which poultry carcasses cannot be processed thus reducing plant efficiency. Furthermore, when bacteria penetrates cracks or pores in the rubber fingers, it is difficult and time consuming to complete adequate decontamination/sterilization using conventional methods.

As a further drawback, conventional rubber picking fingers are relatively large in diameter and thus have substantial mass per unit of length. For this reason, in a conventional picking line, prior art fingers strike poultry carcasses with considerable force and are prone to damaging the carcasses and/or reducing yield e.g. breaking the commercially valuable wings and/or causing the fat of the carcass to be expelled from beneath the skin of the bird. When fat is removed from the carcass, the effective yield of the carcass is decreased (i.e. because poultry is sold by weight). In fact, as much as ½ to 2 percent yield is lost due to picker finger design alone. In this regard, due to the sheer volume of poultry processed, losses amounting to as little as ¼ percent yield have an economic impact to a processing plant which approaches millions of dollars per year.

Although U.S. Pat. No. 6,918,825 ("the '825 patent"), entitled Poultry De-Feathering Apparatus and Method, issued to Everett T. Conaway and co-owned herewith, exemplifies vast improvements over rubber picking finger-type designs, additional improvements on the technology disclosed in the '825 patent are desired.

For example, because conventional rubber picking finger-type picking lines employ complex, expensive machinery which is not easily replaced or reconfigured (and operational downtimes of picking lines result in significant economic loss), it would desirable to have the capability to utilize the elongated picking elements described in the '825 patent without requiring extensive retooling and/or reconfiguration of existing picking line machinery. In this regard, it would be desirable to have an inexpensive and/or rapid and/or efficient manner for converting such conventional machinery to use elongated picking elements and/or elongated picking element bundles.

Additionally, improvements in the manner of connecting picking structures (e.g., including elongated picking elements such as described in the '825 patent as well as other types) to conventional picking disks are desired. For example, the vast majority of rubber picking finger-type designs are configured to be installed through the back of the picking disk. However, as installed in a picking line, the rear surfaces of the picking disks are difficult and sometimes dangerous to access because, at least in part, of limited working space behind the picking disks combined with the proximity to complex moving machinery.

In view of the above enumerated drawbacks and/or desires for improvements in the art, it is a purpose of the herein described invention to address one or more of such drawbacks and/or desires as well as, or in the alternative, other needs (such as improved feather picking abilities and/or efficiency) which will become more apparent to the skilled artisan once given the present disclosure.

SUMMARY OF THE INVENTION

Generally speaking, this invention addresses the above-described needs in the art by providing improved picking methods, apparatus, and/or parts thereof. In some example embodiments, the present invention provides elongated picking element modules which can be employed to inexpensively and/or rapidly and/or easily convert conventional picking lines. In certain embodiments of such modules, the modules have a unique plug structure in combination with and connected to plurality of elongated picking elements. In certain additional exemplar embodiments, the plug structures of the modules have designs which permit front side installation into picking disks.

In certain example (non-limiting) embodiments, there is provided an elongated picking element module having a plug having a first closed end and a circumferentially extending side wall extending therefrom to a second end open for receiving a plurality of elongated picking elements, a detent which is formed in and extends circumferentially around an outer surface of the side wall and which is spaced generally between the first closed end and the second open end, an inner surface of the circumferentially extending side wall which defines a substantially hollow cavity that extends at least substantially beneath the detent, a plug base portion defined by an area of the side wall between the detent and the first closed end, and a plug base portion defined by an area of the side wall between the detent and the second open end; and a plurality of elongated picking elements disposed and secured within the plug shoulder portion.

In any of the preceding or alternative embodiments, the outer surface of the side wall area of the plug base portion extends non-perpendicularly at an incline from the first closed end towards the detent.

In any of the preceding or alternative embodiments, a select length of the side wall area between the non-perpendicularly extending inclined portion and the detent is oriented generally perpendicular relative to and extending from the first closed end.

In any of the preceding or alternative embodiments, the plug base portion has a first outer diameter and the plug shoulder portion has a second outer diameter; wherein the second outer diameter is greater than the first outer diameter.

In any of the preceding or alternative embodiments, the detent is generally u-shaped and has two opposite facing walls which are oriented generally parallel to each other and which are spaced apart and connected to each other by a third wall, the third wall and the two opposite facing walls, in combination, defining a recess for receipt of a wall portion of an aperture of a picking disk.

In any of the preceding or alternative embodiments, the two opposite facing walls of the detent are unequal in height.

In any of the preceding or alternative embodiments, the elongated picking element module is functionally installed in a picking disk, the picking disk having a disk body defined by front and rear walls, the disk having a plurality of apertures which are surrounded by the front and rear walls, wherein the elongated picking element module is connected to one of the plurality of apertures of the disk body via mechanical, removable interconnection of the plug to the aperture.

In any of the preceding or alternative embodiments, the front and the rear walls which define the body of a picking disk and surround the apertures contained therein are in abutting contact with the two opposite facing walls of the detent.

In any of the preceding or alternative embodiments, an edge portion of the aperture in a picking disk is in abutting contact with the third wall of the detent.

In any of the preceding or alternative embodiments, a thickness of the circumferentially extending plug wall proximal and surrounding the plug detent as well as defining the third wall of the detent, combined with the location of the substantially hollow cavity extending at least substantially beneath the hollow detent, provides flexibility to the circumferentially extending wall to permit the plug base portion to be inserted into an aperture of a picking disk which has a diameter which is the same or less than the first outer diameter of the plug base portion.

In any of the preceding or alternative embodiments, when the plug base portion is inserted into the aperture of a picking disk, the circumferentially extending wall exhibits a spring-like effect to thereby bias against the aperture when installed therein to substantially eliminate rotation of the elongated element picking module within the aperture when installed on a picking disk during picking line operation.

In any of the preceding or alternative embodiments, a divider is disposed within the plug's substantially hollow cavity to divide the substantially hollow cavity into first and second cavity regions; wherein the first cavity region extends generally under the plug detent and is generally empty, and the second cavity region extends to the plug's open second end and contains butt ends of the plurality of elongated picking elements disposed and secured therein.

In any of the preceding or alternative embodiments, the plurality of elongated picking elements are connected to the divider, wherein the plurality of elongated picking elements are secured within the second cavity region and connected to the divider by an amount of glue capable of bonding the butt ends of the plurality of elongated picking elements generally to one another, to the divider, and to an inner surface of the plug side wall generally defining the second cavity region.

In any of the preceding or alternative embodiments, the inner surface of the plug side wall is oriented at an angle measured from perpendicular relative to the first closed end selected from a range consisting of between 0.5 and 5 degrees.

In any of the preceding or alternative embodiments, end portions of a majority of the plurality of elongated picking elements, extending from the second open end of the plug, are oriented at flare angles selected from a range consisting of between 5 and 30 degrees.

In any of the preceding or alternative embodiments, the plurality of elongated picking elements includes approximately 50 to 150 elongated picking elements.

In any of the preceding or alternative embodiments, each of the plurality of elongated picking elements is approximately 2.5 to 7.0 inches in length.

In any of the preceding or alternative embodiments, each of the plurality of elongated picking elements selected from the group consisting of filaments, fibers, bristles, and substantially rigid threads.

In any of the preceding or alternative embodiments, each of the elongated picking elements and the plug is made from NYLON.

In any of the preceding or alternative embodiments, each of the elongated picking elements has a diameter of approximately 10 to 240 mils.

Certain examples of the invention are now below described with respect to certain non-limiting embodiments thereof as illustrated in the following drawings wherein:

DETAILED DESCRIPTION OF CERTAIN EMBODIMENTS

For a more complete understanding of the present invention, reference is now made to the following description of various illustrative and non-limiting embodiments thereof, taken in conjunction with the accompanying drawings in which like reference numbers indicate like features.

Figure 1:
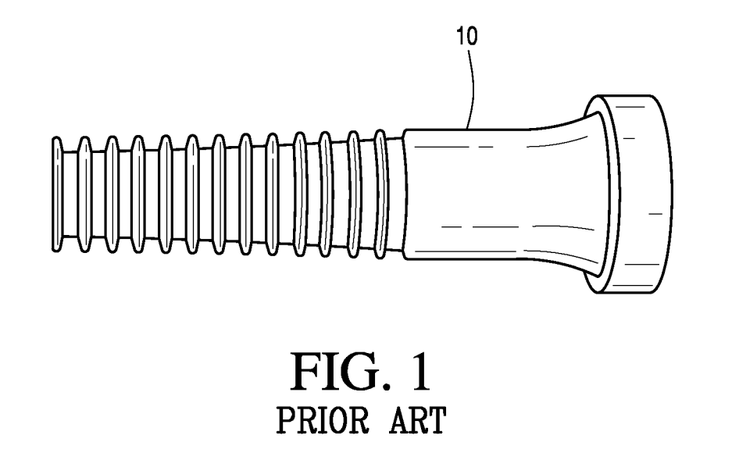
FIG. 1 shows a prior art rubber picking finger.

The present invention is directed to new types of picking elements that may be used in place of the conventional rubber fingers typically employed in picking lines (an example of such a conventional rubber finger 10 is shown in FIG. 1), and is further directed to apparatus and methods employing these inventive picking elements.

In general, picking elements of the present invention include plugs and elongated picking elements, a plurality of which are disposed inside a plug on one end and fan out at their other end; the resulting picking elements being referred to interchangeably and generally herein as "elongated picking element modules" and "picking element modules." In preferred embodiments, the structure of the plugs permit the elongated picking element modules to be readily inserted and removed from the apertures of motorized picking disks that are typically employed in picking lines, to be seated firmly within those apertures during rotational operation, and to orient the elongated picking elements in an optimal manner for feather removal. Further, the use of elongated picking elements to remove the feathers has been found to offer numerous advantages over the use of prior art rubber fingers.

As discussed and shown in greater detail below, the elongated picking element modules of the present invention remain extremely stable during operation, in that they generally do not wobble or rotate within the apertures of the picking disks while the disks are rotating: they do not crack or form microscopic holes where bacteria can grow; they are extremely effective at feather removal; they do not cause significant carcass damage while removing feathers (for example, with respect to wing breakage, fat expulsion, and/or overall bruising); they can be readily inserted and removed from the picking line disks with a simple hand tool; and in general they only need to be replaced when they are worn down so as to be ineffective at removing feathers, but do not need to be replaced prematurely due to contamination. As a result of these and other aspects of the present invention, the inventive elongated picking element modules offer benefits with respect to product safety, quality and yield, as well as cost benefits with respect to labor, maintenance and the replacement of parts.

Figure 2:
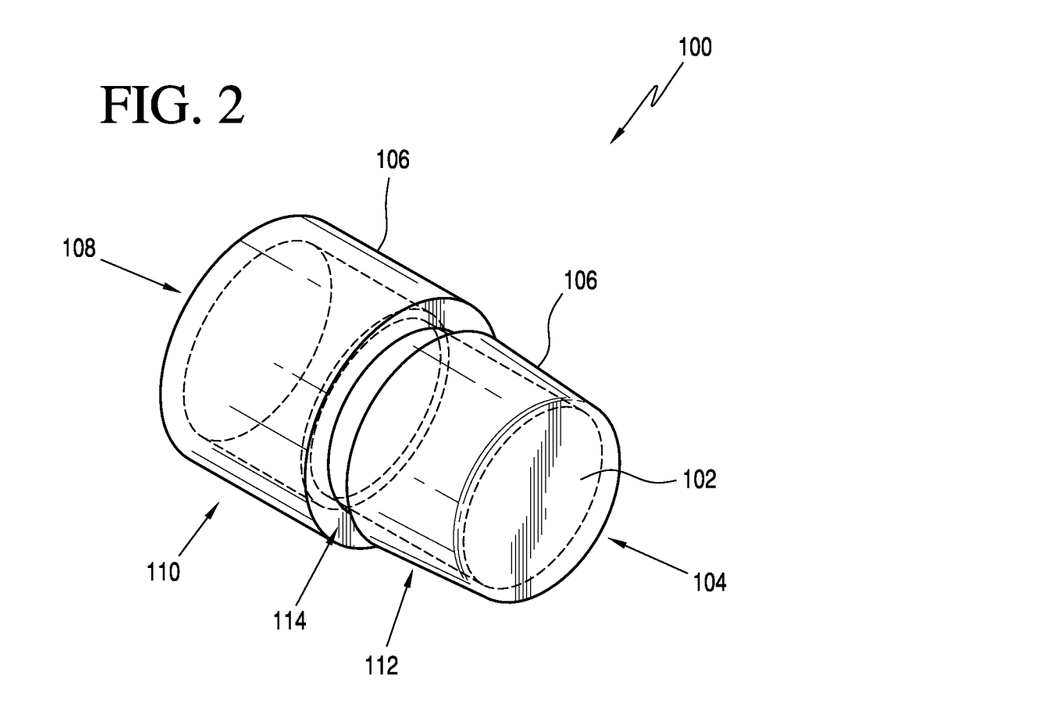
FIG. 2 shown a perspective view of one embodiment of a plug used in the elongated picking element modules of the present invention.

Turning now to FIG. 2, a preferred embodiment of a plug 100 of the present invention is shown. In this embodiment, plug 100 includes a bottom member 102 at a first closed end 104, a circumferentially extending side wall 106 that extends from the first closed end 104 to a second open end 108 for receiving a plurality of elongated picking elements, the inner surface of said side wall 106 forming a substantially hollow cavity 105 (which can be seen in the cross-sectional view shown in FIG. 4a).

Figure 4A:
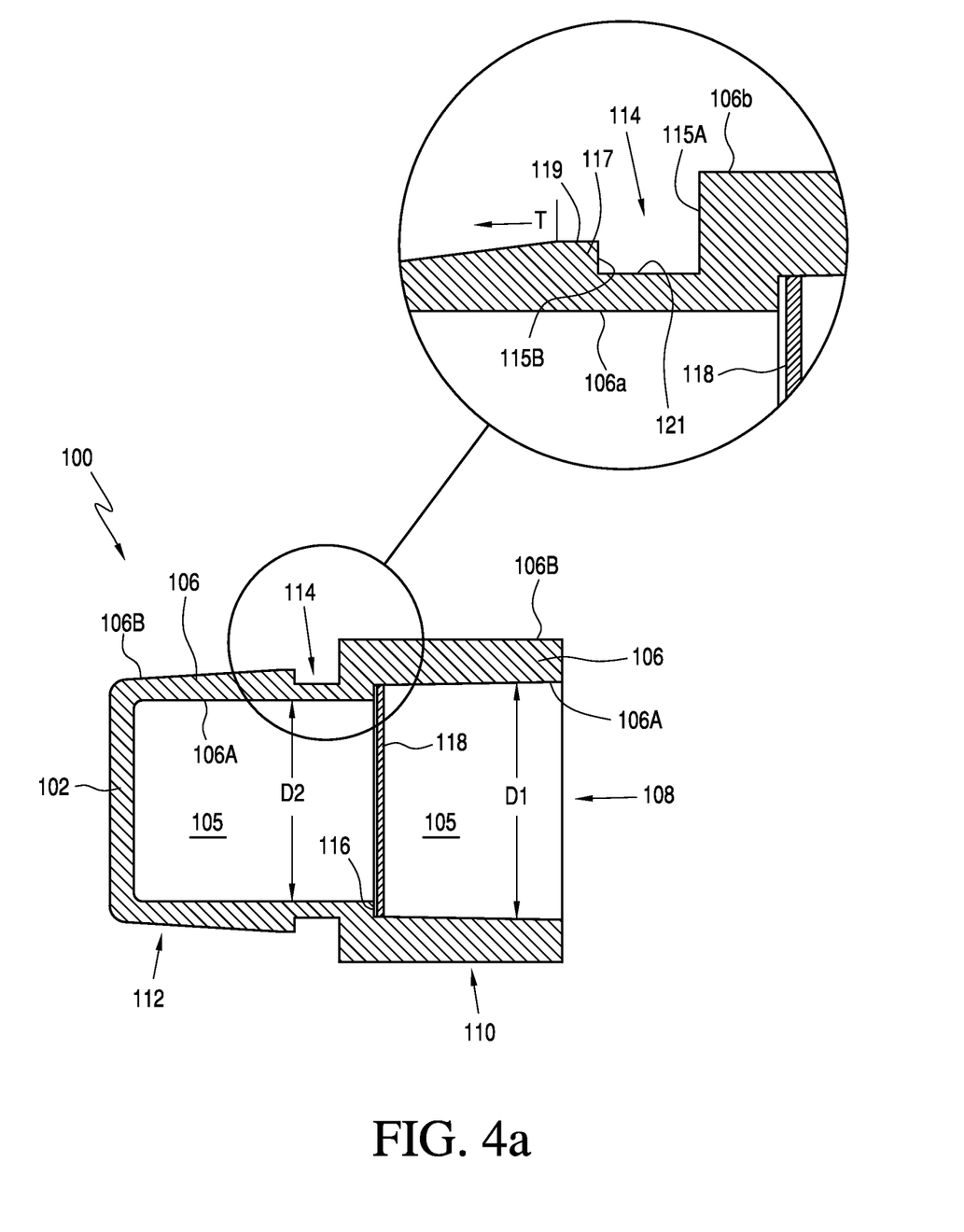
FIG. 4a. shows a cross-sectional side view of the plug shown in FIG. 2, including an exploded view of the plug's side wall.

A detent 114 is formed in and extends circumferentially around an outer surface of the side wall 106, and is spaced generally between first closed end 104 and second open end 108. As shown in FIG. 4a, detent 114 is, in certain preferred embodiments, generally U-shaped and has two opposite facing walls 115A, 115B which are oriented generally parallel to each other (each of which are generally oriented vertically in FIG. 4A forming a circumferential detent 114) and which are spaced apart and connected to each other by a third wall 121 (which is oriented generally horizontally in FIG. 4A). In certain preferred embodiments and as shown in FIG. 4A, the opposite facing side walls 115A. 115B are unequal in height. When plug 100 is inserted into the aperture of a picking line disk, detent 114 mates tightly with the edge of the aperture to hold the plug firmly in place. While the detent 114 may be of any size suitable for mating with the edge of the aperture, it has been found that a length of about ⅛ inches and a depth of about 1/16 inches is preferred. An area of the side wall 106 between the detent 114 and the second open end 108 defines a plug shoulder section 110, and an area of the side wall 106 between the detent 114 and the first closed end 104 defines a plug base section 112.

Figure 3:
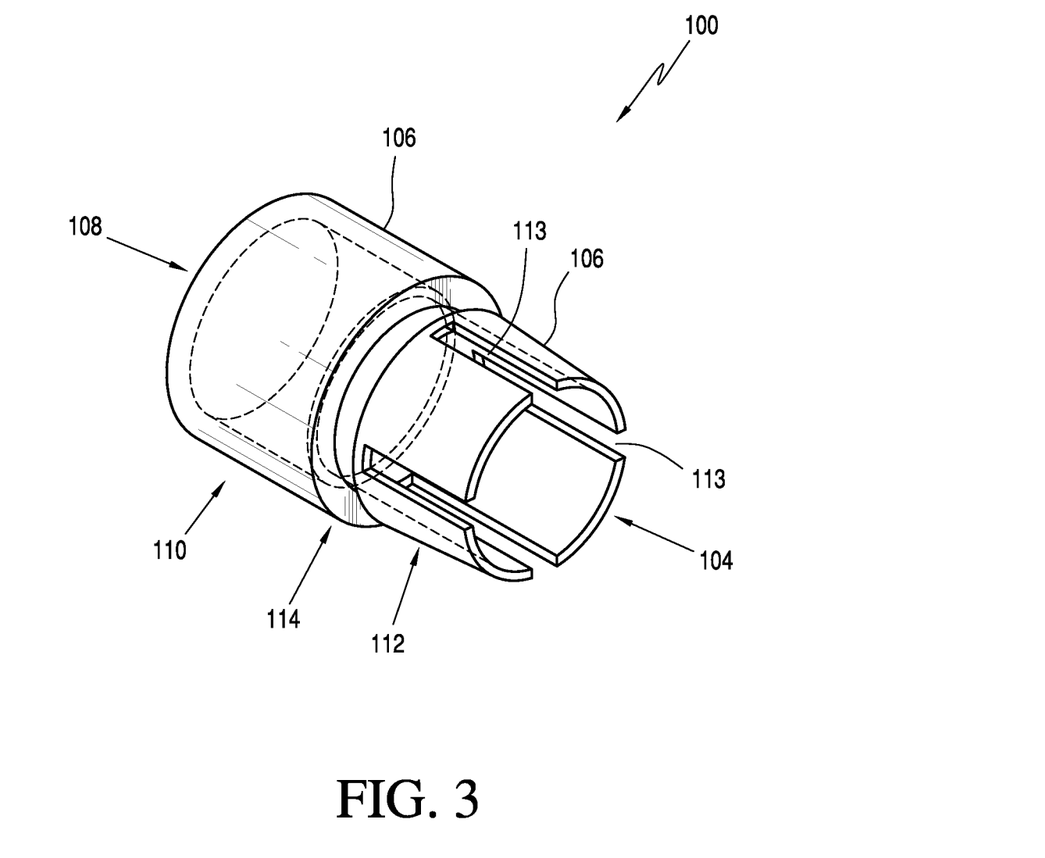
FIG. 3 shown a perspective view of another embodiment of a plug used in the elongated picking element modules of the present invention.

Plug 100 may, in an alternative embodiment, be open on both of its ends 104, 108, as shown in FIG. 3. In this embodiment, the area of side wall 106 defining the lower plug base section 112 optionally includes longitudinal slits 113 which, when present, facilitate insertion of the plug into the aperture of a picking disk by allowing the lower plug base section 112 to be compressed during insertion, after which it will expand back to its original configuration.

Turning now to FIG. 4a, a cross-sectional side view of the plug shown in FIG. 1 is provided. As shown, side wall 106 has an inner side wall surface 106A and an outer side wall surface 106B, each of which may be oriented non-perpendicular at a particular angle with respect to the plug's first closed end 104. For example, the inner side wall surface 106A may be angled with respect to the plug's first closed end 104 to orient the elongated picking elements in a particular manner, and the outer side wall surface 106B may be angled with respect to the plug's first closed end 104 to facilitate insertion of the plug 100 into an aperture of a picking disk. In this embodiment, inner side wall surface 106 A has a diameter D1 at the plug's upper shoulder section 110 which is greater than its diameter D2 at the plug's lower base section 112, which results in the formation of a lip 116. A divider disk 118 may be inserted into the plug such that it comes to rest on lip 116 and completely walls off the plug's lower base section 112 to prevent contaminants (feathers, guts, bacteria, and the like) from entering during a picking operation, and further serves as a surface for attaching the plurality of elongated picking elements. To increase the friction between the divider 118 and the inner side wall surface 106A (to help hold it firmly in place), the disk may optionally have bumps, ridges, etc. along its perimeter.

As mentioned above, in certain embodiments the inner and/or outer side wall surfaces may be oriented non-perpendicularly with respect to the plug's first closed end 104 to respectively orient the elongated picking elements and facilitate insertion of the plug into the aperture of a picking disk. In preferred embodiments, the plug's inner side wall surface 106A is oriented at an angle measured from perpendicular relative to the plug's first closed end 104 between 0.5 and 5 degrees. In the preferred embodiment illustrated in FIG. 4a, the plug's inner side wall surface 106A is oriented at an angle measured from perpendicular relative to the plug's first closed end 104 of about 1 degree, which has been found to result in a flaring of the filaments once disposed in the plug's shoulder section 110 at an angle of about 5-15 degrees when the plug is at rest, and at an angle of about 15-30 degrees when the plug is rotating during a picking operation (for effective feather removal, particularly in hard-to-reach areas on the carcass). As will be understood by one of skill in the art, different applications will dictate the use of different elongated picking elements (lengths, diameters, materials, etc.), the choice of which will dictate the angle at which the inner side wall should be disposed to achieve the desired flare.

Figure 5:
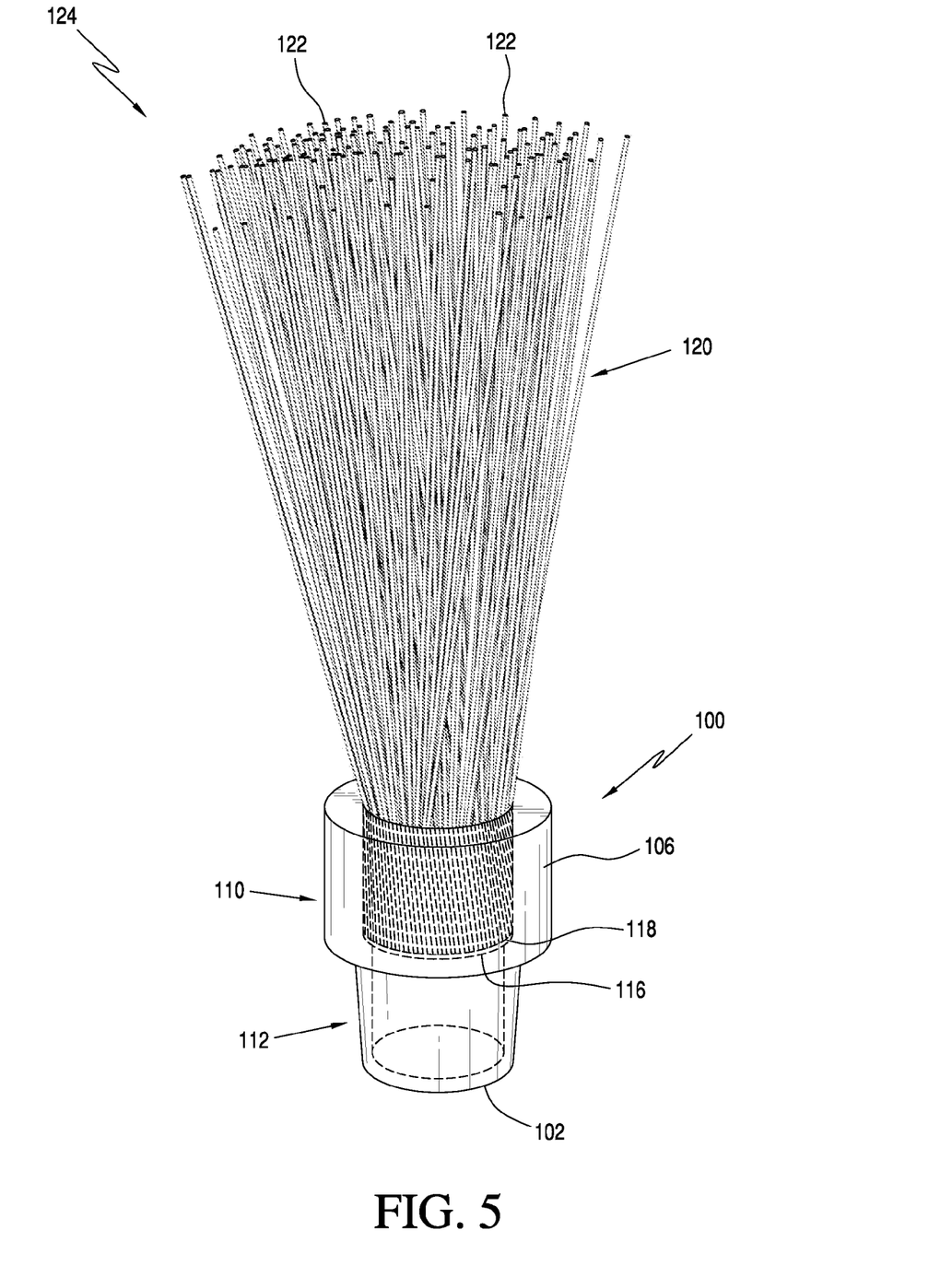
FIG. 5 shows a perspective view of one embodiment of an elongated picking element module of the present invention.

As used herein, to say that the elongated picking elements "flare out" from the plug at a particular angle means that the portions of the elongated picking elements extending from the plug are generally oriented at that angle with respect to the sides of the plug. As will be appreciated by those skilled in the art, the elongated picking elements are flexible in nature (as a result of the material from which they're made, their shapes, lengths, diameters, and the like) and therefore the portion of the elongated picking elements that extends from the plug will have at least a slight natural bend, resulting in some degree of flare (as illustrated in FIG. 5). Generally, when the inner side wall 106A of the shoulder section 110 is angled with respect to the plug's first closed end 104 in certain embodiments, the elongated picking elements will flare out from the plug at a greater angle than they would in the absence of the wall being so angled. When the elongated picking elements are then rotated axially during operation, they flare out from the plug at a greater angle than when at rest.

As shown in the exploded view in FIG. 4a, the outer side wall surface 106B may come off wall 115A of detent 114 at a right angle such that a select length 119 of the outer side wall surface 106B runs generally parallel to the inner side wall surface 106A before the outer side wall surface 106B begins to taper at about "T" in the direction shown. It has been found in the present invention that this substantially non-tapered length 119 of the outer side wall surface 106B serves two important functions. First, during insertion of the plug into an aperture of the picking disk, it prevents corner 117 from breaking off, which was found to occur in designs where the outer side wall 106B is tapered along the entire length of the plug's lower section 112. Second, it helps hold the plug firmly in place in the aperture of the picking disk as it rotates during operation (i.e., it does not rotate or wobble within the aperture, and therefore there is no space between the plug and the surface of the picking disk in which feathers or other contaminants may lodge). Without limiting the invention in any way, it has been found that, for the enumerated benefits, a length of about 1/16 of an inch for the non-tapered select length 119 of the outer side wall 106B is preferred, and that an angle of taper for the outer side wall 106B at base section 112 of about 4 degrees is preferred.

Figure 4B:
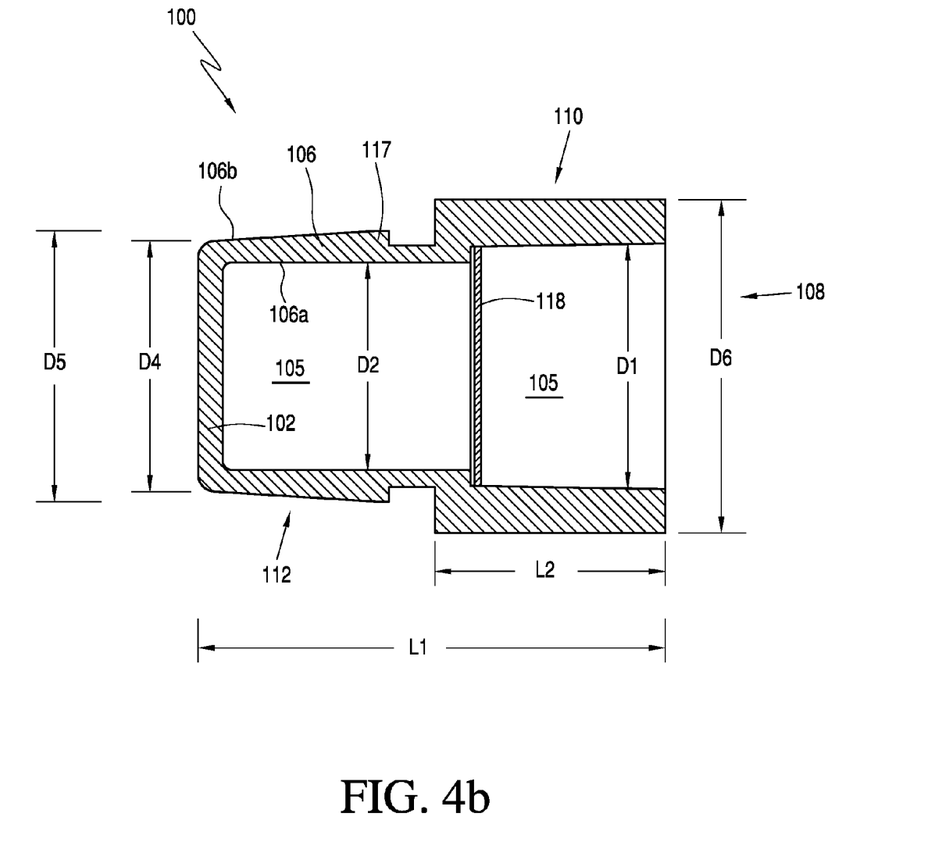
FIG. 4b. illustrates certain preferred but optional dimensions of the plug shown in FIG. 2.

It is understood that all dimensions provided herein are exemplary, and that in fact all components used in the present invention may be of any dimensions that renders them suitable for the uses described herein. With that understanding, certain preferred but optional dimensions of plug 100, which have been found to afford many of the benefits enumerated herein, are illustrated in FIG. 4b, wherein the plug's lower section 112 has an inner side wall diameter D2 of 0.625 inches and an outer side wall diameter D5 of 0.740 inches which tapers to a diameter D4 of 0.685 inches; the plug's upper section 110 has an inner side wall diameter D1 of 0.683 inches and an outer side wall diameter D6 of 0.850 inches; the plug's upper section 110 has a length L2 of 0.625 inches; and the plug 100 has an overall length L1 of 1.25 inches.

Turning now FIG. 5, a plurality of elongated picking elements 120 is inserted into plug 100 to form a complete elongated picking element module 124 for use in a picking line. In this embodiment, the elongated picking element module 124 is formed by first inserting divider 118 into the plug 100 so that it comes to rest on lip 116, thereby walling off the plug's lower base section 112 to keep it free of contaminants. About 1 gram of medical grade adhesive is then dropped into the plug's upper shoulder section 110, after which the plurality of elongated picking elements 120 is inserted and twisted in a counter-clockwise direction. The adhesive is then allowed to cure. Of course, any suitable adhesive and amount may be used, but it has been found that 1 gram of medical grade adhesive is preferred in that it results in each of the elongated picking elements adhering to the divider 118, the plug's inner side wall 106A, as well as to each other, while at the same time this volume does not result in adhesive spilling out from the plug.

When the inner side wall 106A of upper shoulder section 110 is angled with respect to the plug's first closed end 104 as described above to cause the elongated picking elements to flare out from the plug as shown in FIG. 5, each of the elongated picking elements 122 will be oriented generally non-perpendicularly to the plug's bottom member 102 (meaning simply that they are generally not at a 90 degree angle with respect to the bottom member 102). It has been found that the flaring of the elongated picking elements as described above increases their effectiveness to remove feathers from a carcass as they are spinning during a picking operation (including removing feathers that may be missed when they are not flared, and that may be missed by rubber fingers), and further minimizes carcass damage. Moreover, this flaring of the elongated picking elements has been found to improve their "memory" (i.e., the ability of the elongated picking elements to generally return to their shape when the picking line is shut down and they stop rotating). In this regard, it has further been found that if the rotation of the picking disks is reversed at certain points during the de-feathering operation, the elongated picking elements regain their memory more quickly, and as such it may be advantageous to schedule reversing the rotation of the picking disks at preset times during operation.

In certain preferred embodiments, each of the elongated picking elements used in the inventive picking elements may be about 2.5 to 4.0 inches in length, preferably about 3.25 inches in length, and may have a diameter of about 10 to 240 mils, preferably about 20 to 100 mils, more preferably about 40 to 80 mils, and most preferably about 60 mils. As will be understood by those skilled in the art, preferred diameters are determined according to the speed of rotation of the elongated picking elements during operation and the picking area of the bird (i.e., whether it is a small or large feather area). In some embodiments, the elongated picking elements along the perimeter of the bundle may have a larger diameter than those on the interior, so that all of the elongated picking elements will wear evenly. Moreover, each bundle of elongated picking elements may include any number of elongated picking elements suitable for its intended application. For example, in a typical poultry processing operation, each bundle may have about 50 to 150 elongated picking elements; preferably about 90 to 110 elongated picking elements, and most preferably about 95 elongated picking elements.

Further, as will be understood by those of skill in the art, the elongated picking elements used in the present invention may be of any structure and material that renders them suitable for use in removing feathers in a food processing environment. In certain embodiments, the elongated picking elements may be longer and the number of elongated picking elements present in a tuft bundle may be greater than otherwise described herein; all of which are contemplated and fall within the scope of the present invention. For example, certain birds, such as turkeys, may require an elongated picking element length of at least six inches to effectively remove the feathers from the carcass. Moreover, the elongated picking element modules of the present invention are suitable for use in picking lines in which the picking disks are situated either vertically or horizontally, and are further suitable for use in other types of picking lines, such as where rotating picking drum units are employed.

The term "elongated picking element" as used herein is understood to include, but is not limited to, filaments, fibers, bristles, wires and substantially rigid threads. Further, as mentioned, elongated picking elements used in the present invention may be made of a number of suitable materials, and certain preferred materials have been identified as particularly advantageous through experimentation and testing. Specifically, crystalline resin polymer filaments have demonstrated excellent de-feathering abilities while exhibiting no visible cracking or poring. Substantially reduced losses in production yield have been observed as well with such filaments. In this regard, wing breakage may be eliminated and poundage yield loss may be reduced by approximately 0.25 to 2%. Although many such filaments are commercially available from a variety of manufacturers, a particularly successful filament which has been tested is a NYLON filament manufactured by DuPont under the tradename Tynex 612, which have demonstrated at least most, if not all, of the enumerated desired qualities, and furthermore are known for their relative durability when exposed to high temperatures. Resistance to high temperatures, in this regard, is particularly important because large frictional forces are generated as the picking elements strike poultry carcasses and each other during picking operations. In some embodiments, the elongated picking elements may also be coated with anti-bacterial products or other products, such as products that prevent them from sticking to each other. Moreover, the plug 100 and divider 118 may be made of any suitable material, but it is preferred that they also be made from NYLON material, as it has been found that when all components are made from the same NYLON material they adhere to each other favorably (i.e., the elongated picking elements adhere to the disk, the inner side wall of the plug, and also to the other elongated picking elements).

Although variations of these elongated picking element materials and/or structures may be employed in the present invention, the selection of a specific elongated picking element construction and/or structure may be determined by employing one or a combination of factors. For example, durability of the elongated picking element, including resistance to cracking and micro-poring and/or hole formation, is desired. Furthermore, a structure which has a mass per unit length which is substantially less than that of rubber "fingers" employed in conventional de-feathering systems is desirable. This reduced mass is achieved through at least one but preferably through a combination of factors including shape and/or size selection including, but not limited to, element diameter and/or element length to diameter ratio selection (e.g. long, thin elongated picking elements are desirable). Other factors to consider when selecting materials and/or structures for the elongated picking elements are the relative flexibility or relative stiffness of the material/structure, and whether or not the material/structure possesses memory.

Moreover, although filaments, fibers, bristles, and/or substantially rigid threads are desired embodiments of the elongated picking elements used in the present invention, a strict definition of acceptable structures is not relied upon herein. Rather, any filament, fiber, bristle, thread and/or similar structure may be employed as long as such structure exhibits the desired properties as enumerated herein and is suitable for its intended use. More specifically, in this regard, it is desired in certain embodiments that the elongated picking elements employed have relatively high length to diameter ratios, and therefore low mass to unit length ratios. An exemplar range of length to diameter ratios is about 10:1 to about 1000:1, preferably about 20:1 to about 500:1, and more preferably about 100:1 to about 200:1. An exemplar range of effective element diameters is about 10 to about 240 mils (1 mil=$\frac{1}{1000}$th of an inch). It is further desired that the elongated picking elements exhibit suitable durability characteristic. Any structure, comprised of any material, constructed according to these guidelines may be employed in the present invention.

Figure 6:
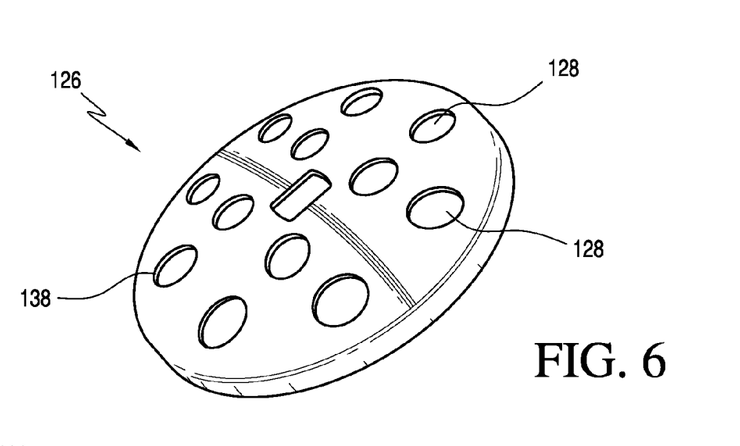
FIG. 6 shows a conventional picking disk used in picking lines for use with the elongated picking element modules of the present invention.

Turning now to FIG. 6, a conventional picking disk 126 typically used in picking lines is shown. The picking disk 126 is shown having twelve apertures 128, but smaller picking disks having six apertures are also commonly used in the art as well (and the use of other picking disks of various sizes and having different numbers of apertures is contemplated in the present invention, as well). Although the picking disk shown in FIG. 6 is shown as a standalone unit, in practice the picking disks are mounted on the shaft of a motor unit of the picking line when the inventive picking element modules are inserted. In common practice, a rubber picking finger 10 (FIG. 1) is inserted into each of the apertures 128 of the picking disk 126, typically with a hydraulic tool or from behind by hand. In the present invention, the inventive picking element modules shown in FIG. 5 are inserted into these apertures in place of such rubber fingers.

Figure 7A:
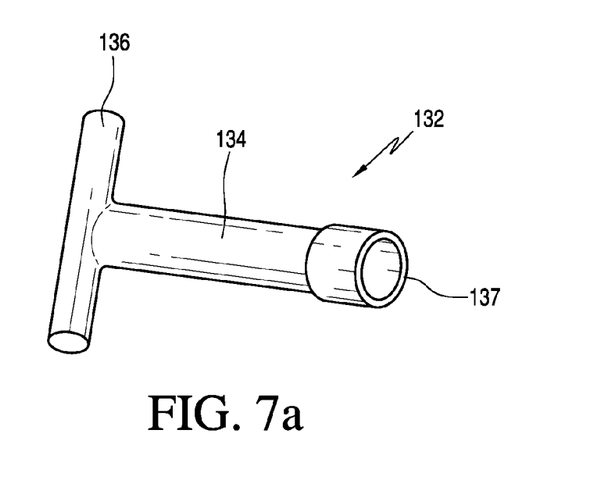
FIGS. 7a and 7b show alternative embodiments of a hand tool that is useful for inserting and removing the elongated picking element modules of the present invention into the apertures of the picking disk shown in FIG. 6.

The inventive elongated picking element modules may be inserted in any suitable way, but in one preferred embodiment a simple hand tool 132 (shown in FIG. 7*a*) is used, wherein the elongated picking elements 122 are gathered together and inserted into the tool's elongated shaft 134 until the plug's upper shoulder section is seated within the tool's open end 137 (at which point the elongated picking elements are contained entirely within the elongated shaft 134). The tool is then grasped by its handle 136 and the plug's lower base section 112 is inserted into the aperture 128 of the picking disk 126 (which is facilitated by the tapering of the plug's outer wall at base section 112, as discussed above) and pressed into place with sufficient force (by hand or with a mallet) to tightly mate the detent 114 on the plug's outer wall with the edge 138 of the aperture 128 to seat the picking element modules firmly in place, such that the plug's upper and lower sections 110, 112 are then located on opposite sides of the picking disk 126 (as shown in side view in FIG. 8).

Figure 7B:
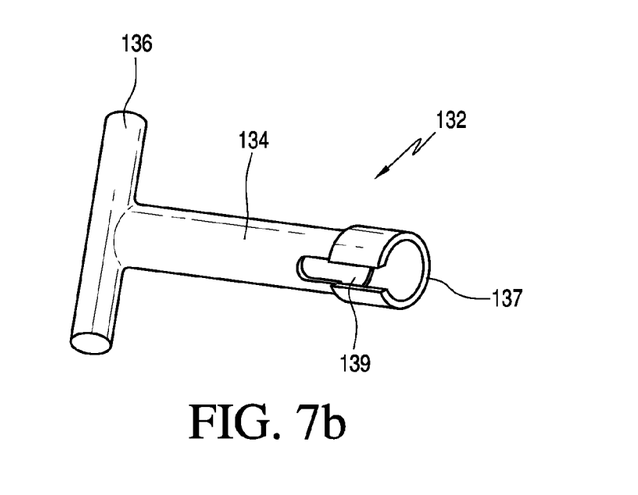

In an alternative embodiment shown in FIG. 7*b*, the tool 132 may have a slit 139 at its open end 137 to facilitate insertion of the elongated picking elements 122 into the shaft 134. The ability to insert and remove the inventive picking element modules from the "front" sides of the picking disks (i.e., the sides facing the poultry conveying line), whether by hand, by use of one of the tools shown in FIG. 7a or FIG. 7b, or by the use of a different type of tool, is important in that the picking disks are mounted to motors, and therefore reaching behind them to install the picking elements, as is typically required to install rubber fingers, offers little working room, and can be both difficult and dangerous.

As the plug 100 is pressed into the aperture 128 of the picking disk 126, the thickness of the plug's side wall 106 surrounding the detent 114 in combination with the substantially hollow cavity 105 at the plug's base portion 112 provides flexibility to the side wall 106 to permit the base portion 112 to be inserted into the aperture 128 which has a diameter that is the same or less than the outer diameter of the plug's base portion. Once the plug 100 is inserted into the aperture 128, the plug's side wall 106 therefore, due to such flexibility, exhibits a spring-like effect to thereby bias the plug against the aperture to substantially prevent the plug from rotating within the aperture as it rotates axially during a picking operation. In similar regard, once the plug 100 is inserted into the aperture 128, the two opposite facing walls 115A, 115B of the detent 114 will be in abutting contact with the front and rear sides of the picking disk 126, respectively and/or the third wall 121 will be in abutting contacting with the edge 138 of the aperture 128 of the picking disk 126.

With further regard to the installation process, as discussed above, if the plug's outer side wall 116B is tapered along its entire length, it has been found that corner 117 (FIG. 4A) tends to break off when the plug 100 is pressed into place, so it is preferred that the outer area of the plug's side wall include at least a select length 119 of the outer side wall 106B where it is not tapered (FIG. 4A) to prevent corner 117 from breaking off, and which further helps keep the plug seated firmly in place as the picking disk rotates.

This installation process generally outlined above is repeated for each picking element module until each of the apertures of the picking disk is filled, at which time the picking line is ready for operation (an exemplary picking line is shown, for example, in U.S. Pat. No. 6,918,825, which is hereby incorporated by reference in its entirety).

In operation then, the picking disks and inventive picking element modules are rotated at a suitable speed, for example at about 200 to 2000 RPM, preferably at about 300 to 1400 RPM, more preferably at about 400 to 1200 RPM, and still more preferably at about 600 to 1000 RPM. In practice, the most preferred de-feathering results have been achieved when the picking disks are operated at speeds of about 900 RPM. At such speed, the elongated picking elements have been found to strike the bird carcasses in such a manner that effectively removes the feathers without causing damage to the carcass. Specifically, during axial rotation each elongated picking element reaches a threshold velocity which causes a feather to wrap around a portion of the elongated picking element, thereby binding it to the elongated picking element and plucking it from the carcass as the elongated picking element continues to rotate. In effect then, as multiple elongated picking elements contact multiple feathers on a carcass, numerous feathers are removed with each picking disk rotation.

Figures 8, 9:
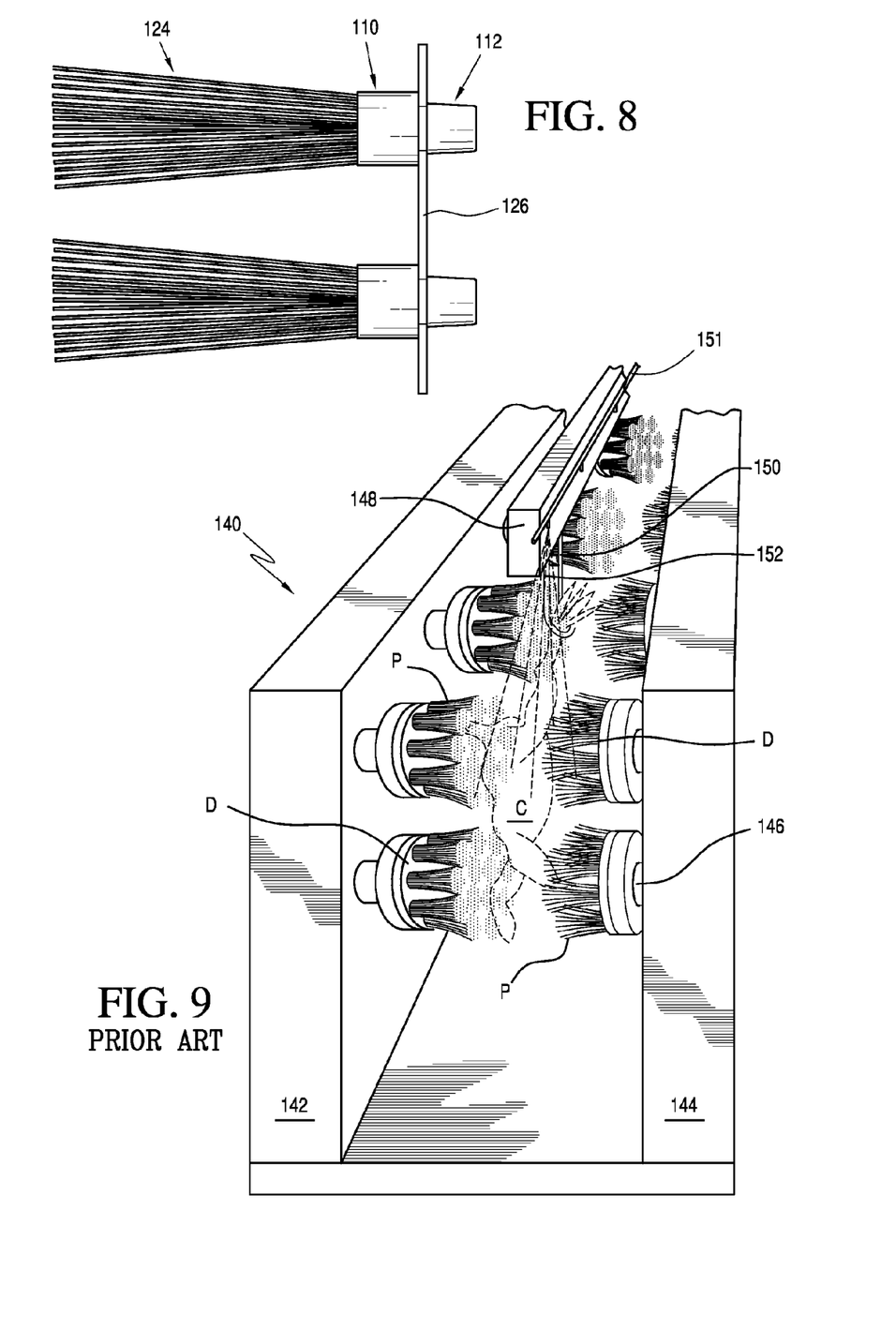
FIG. 8 shows a side view of the elongated picking element modules of the present invention once inserted into the apertures of the picking disk shown in FIG. 6.
FIG. 9 illustrates a picking line in operation.

FIG. 9 shows an example of a conventional picking line 140 in which the inventive picking element modules may be employed. Briefly, a picking line 140 typically includes a pair of parallel opposing frame members 142, 144, each carrying a bank of rotatable picking disks D (each of which may be, for example, picking disk 126 shown in FIG. 6) on rotatable shafts 146. Frame members 142, 144 typically house motors (not shown) for driving the rotation of the shafts 146 which in turn drive the rotation of the picking disks D. Because counter rotation of picking disks located adjacent one another is generally preferred, individual motors may be provided for driving individual directions of rotation, or a serpentine belt-type arrangement may be employed to effect the same result (motors and belt not shown). Similarly, picking disks located opposite one another on opposite facing banks are preferably rotated in opposite directions from each other. Such a configuration reduces the tendency of carcasses to be "thrown" or "kicked."

As shown, in a traditional picking line the rotatable picking disk D includes, extending therefrom, a plurality of picking elements P, which in the present invention are in various embodiments the bundles of elongated picking elements 124 shown in FIG. 5, which rotate in conjunction with the rotation of the picking disks D. Therefore, in order to effect the de-feathering of a poultry carcass (e.g. chicken carcass "C", as illustrated), a carcass need only be passed through the space between the banks of picking disks D as they are rotated. In known practice, this is accomplished via a conventional conveying system 148 which includes a plurality of hangers 150 for hanging poultry carcasses by their feet. As conveying system 148 is operated, then, chicken carcass "C" is carried between the rotating picking disks and the elongated picking elements are caused to strike the body and feathers of the carcass, thus effecting a de-feathering ("picking") operation.

The number of columns and rows of picking disks D in each bank (on frame members 142 and 144) is selectable according to the size and design of de-feathering apparatus 140 employed (e.g. the size and/or shape of picking disks D). In this regard, although FIG. 9 illustrates an apparatus 140 having two horizontal rows and four vertical columns of picking disks, other picking disk configurations and numbers may be employed. In particular, the number of columns and rows of rotatable units is normally selected according to the size and type of the picking elements and picking disks which are installed. For example, if smaller sized picking disks are employed, 3-5 (or more) rows and 5-10 (or more) columns of picking disks may be utilized. Still furthermore, the orientations of the picking disks are adjustable to adapt to the size of bird being de-feathered. Likewise, the distance between frame members 142 and 144 is variable to accommodate various sizes of poultry carcasses (i.e., in order to vary the size of the space between the banks of rotatable picking disks). In this regard, apparatus 140 is generally adjustable by pivoting the picking disks D at any needed angle, as well as by adjusting them horizontally and/or vertically.

Due to large frictional forces generated during operation of the de-feathering apparatus 140, unwanted heat is often produced as the picking elements strike the poultry carcasses conveyed therethrough. In order to prevent barking of the poultry (i.e., damaging the outer epidermis and/or bringing blood to the surface of the epidermis), a water line 151 is optionally provided and includes a plurality of spray jets 152 for delivering a stream or spray of water (generally in the range of 60-90 degrees Fahrenheit) onto the picking elements and poultry carcasses during operation. In addition to providing a cooling effect, spray jets 152 wet the poultry feathers to aid in their removal (by rendering them more easily gripped by the picking elements) and help clean away fat from the picking elements so that they remain effective. In some instances, hotter water is used which has the effect of scalding the feathers to aid in their removal. Spray jets 152 are preferably located proximal each column of rotatable picking disks D.

Further, prior to de-feathering, the carcasses are typically subjected to a scalding procedure which afford advantages with respect bacteriology, yield, and product quality, and any known scalding procedure is suitable for use in systems employing the elongated picking element modules of the present invention, including hot scalding, air scalding, cool scalding, etc. One of skill in the art will be able to determine the appropriate scalding method (or no scalding method, as may be appropriate in certain applications) to be used. Examples of certain scalding techniques are set forth in European Patent Application Nos. 1297748 and 1496750, International (PCT) Patent Application Publication No. WO 03/088751, and United States Patent Application Publication No. 2005/0107022, each of which is hereby incorporated by reference in its entirety.

EXAMPLE

Testing of the Inventive Picking Element Modules

Elongated picking element modules of the present invention having the design shown in FIG. 3 were tested in poultry processing plants to determine their effectiveness as well as to observe the amount of damage inflicted on the bird carcasses, particularly as compared to traditional rubber finger picking elements.

Briefly, the picking element modules were installed in conventional picking lines (generally of the type shown in FIG. 9). Birds were introduced to the picking lines at a rate of 140 birds per minute (throats were slit with a bleed time of 2 min, 15 sec: the birds were scalded for 1 min, 15 sees in a first tank at 131 degrees F. and then for 1 min in a second tank at 133 degrees F.) and passed through the picking line in 35 seconds (entrance to exit). Water was introduced to the picking line at 100 degrees F.

Figure 10:
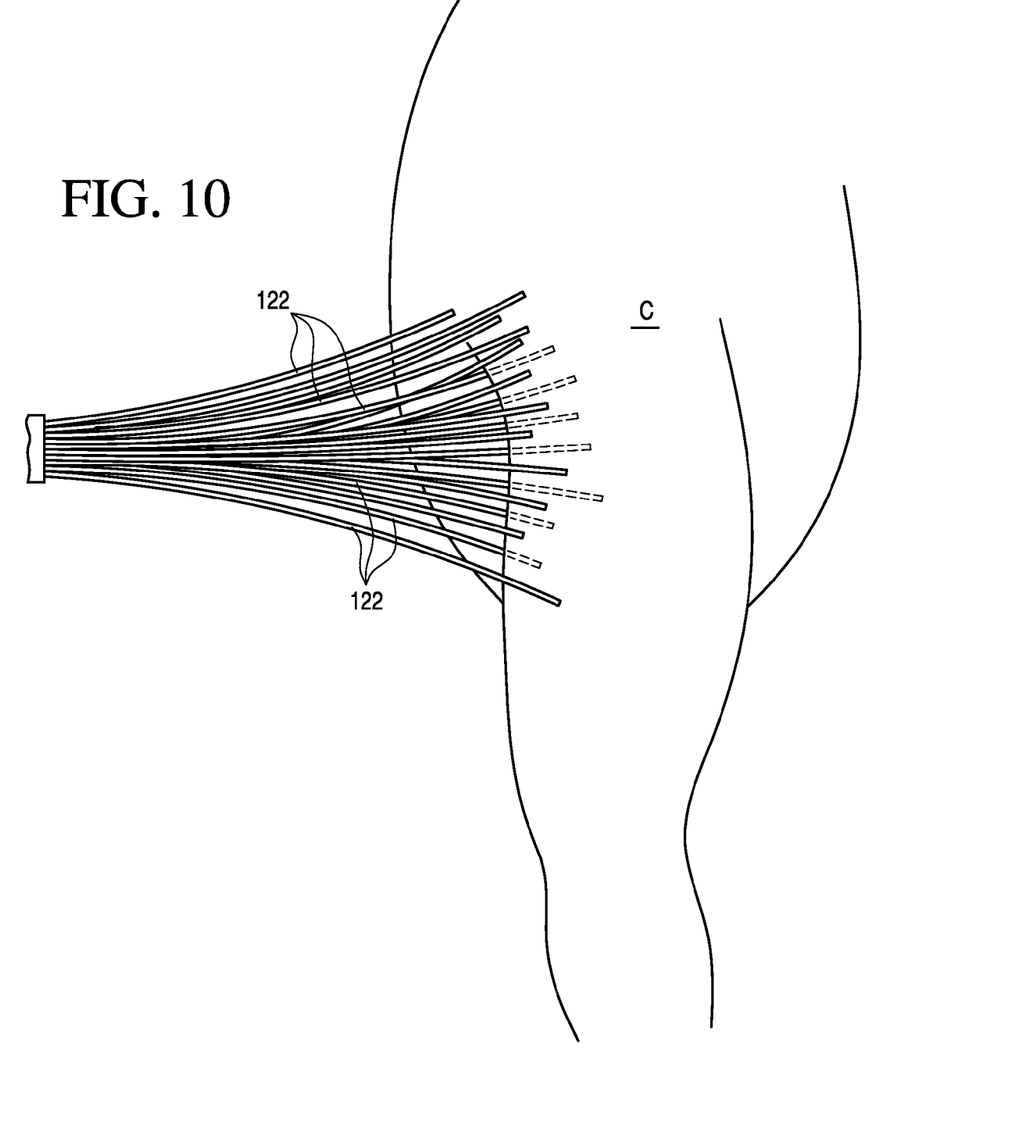
FIG. 10 shows a close up view of one example of an embodiment of the elongated picking element modules of the present invention striking a carcass during operation.

The picking element modules of the present invention were found to be superior at de-feathering the carcasses compared to the conventional rubber fingers. Generally, birds de-feathered using the inventive picking elements were free of feathers. In particular, the inventive picking elements were found to dramatically improve the picking of "straddle-feathers" from the carcasses (i.e., feathers between the legs, as illustrate in detail in FIG. 10), whereas conventional rubber fingers generally did not pick any of those feathers. Moreover, the inventive picking elements were tested in both small (4 inch) and large (6 inch) picking disks, and were found to operate in a stable manner in both (i.e., were able to withstand the forces placed on them during operation, in that they were generally found not to have rotated or wobbled within the apertures of such picking disks). In general, they showed reduced contamination (i.e., feathers, guts, and bacteria), and it was found that no carcass damage generally resulted from use of the inventive picking element modules (breast-skin damage or otherwise).

As shown, use of the inventive picking element modules in place of traditional rubber picking fingers offers improvements in regard to product safety, quality and yield, as well as costs savings, such as in regard to labor, maintenance and replacement parts.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined:

What is claimed is:

1. An elongated picking element module comprising:
a plug having a first end and a circumferentially extending side wall extending therefrom to a second open end for receiving a plurality of elongated picking elements, a detent is formed in and extends circumferentially around an outer surface of the side wall and is located between the first end and the second end, an inner surface of the circumferentially extending side wall defines a substantially hollow cavity that extends at least substantially beneath the detent, a plug base portion is defined by an area of the side wall between the detent and the first end, and a plug shoulder section defined by an area of the side wall between the detent and the second end; and
a plurality of elongated picking elements disposed and secured within said plug shoulder portion.

2. An elongated picking element module according to claim 1, wherein the side wall area defining the plug base portion is substantially frustoconical.

3. An elongated picking element module according to claim 2, the plug base portion is substantially cylindrical.

4. An elongated picking element module according to claim 3, wherein the plug base portion has a first outer diameter and the plug shoulder portion has a second outer diameter; and wherein the second outer diameter is greater than the first outer diameter.

5. An elongated picking element module according to claim 4, wherein the detent is substantially u-shaped and comprises a pair of opposite facing walls which are oriented substantially parallel to each other and which are spaced apart and connected to each other by a third wall, the two opposite facing walls and the third wall, in combination, defining a recess for receiving a wall portion of an aperture of a picking disk.

6. An elongated picking element module according to claim 5, wherein the two opposite facing walls are unequal in height.

7. A picking element module and picking disk assembly, comprising an elongated picking element module according to claim 6 functionally installed in a picking disk, the picking disk comprising a disk body defined by front and rear walls, the disk having a plurality of apertures which are surrounded by the front and rear walls, wherein the elongated picking element module is connected to one of the plurality of apertures of the disk body via mechanical, removable interconnection of the plug to the aperture.

8. A picking element module and picking disk assembly according to claim 7, wherein the front and the rear walls which define the disk body and surround the apertures contained therein are in abutting contact with said two opposite facing walls of the detent.

9. A picking element module and picking disk assembly according to claim 7, wherein an edge portion of the aperture is in abutting contact with the third wall of the detent.

10. An elongated picking element module according to claim 5, wherein a thickness of the circumferentially extending wall proximal to and surrounding the detent and which defines the third wall of the detent, combined with the location of the hollow cavity, provides flexibility to the circumferentially extending wall to permit the plug base portion to be inserted into an aperture of a picking disk which has a diameter which is the same or less than said first outer diameter of said plug base portion.

11. An elongated picking element module according to claim 10, wherein, when the plug base portion is inserted into the aperture of a picking disk, the circumferentially extending wall exhibits a spring-like effect to thereby bias against the aperture when installed therein to substantially eliminate rotation of the elongated element picking module within the aperture when installed on a picking disk during picking line operation.

12. An elongated picking module according to claim 1, further comprising a divider disposed within the hollow cavity which divides the hollow cavity into first and second cavity regions; and wherein the first cavity region extends generally under the detent and is generally empty, and the second cavity region extends to the open second end and contains butt ends of the plurality of elongated picking elements disposed and secured therein.

13. An elongated picking module according to claim 12, wherein the plurality of elongated picking elements are attached to the divider; and wherein the plurality of elongated picking elements are secured within the second cavity region and connected to the divider by an adhesive capable of bonding the butt ends of the plurality of elongated picking elements generally to one another, to the divider, and to an inner surface of the plug side wall generally defining the second cavity region.

14. An elongated picking module according to claim 1, wherein end portions of a majority of the plurality of elongated picking elements, extending from the second open end of the plug, are oriented at flare angles selected from a range consisting of between 5 and 30 degrees.

15. An elongated picking element module according to claim 1, wherein each of the plurality of elongated picking elements is approximately 2.5 to 7.0 inches in length.

16. An elongated picking element module according to claim 1, wherein each of the plurality of elongated picking elements is selected from the group consisting of filaments, fibers, bristles, and substantially rigid threads.

17. An elongated picking element module according to claim 1, wherein the elongated picking elements and the plug is made from NYLON.

18. An elongated picking element module according to claim 17, wherein the elongated picking elements has a diameter of approximately 10 to 240 mils.

* * * * *